(12) United States Patent
Baudermann

(10) Patent No.: US 9,815,672 B2
(45) Date of Patent: Nov. 14, 2017

(54) LOADING APPARATUS

(71) Applicant: HOERBIGER HOLDING AG, Zug (CH)

(72) Inventor: Ulrich Baudermann, Zug (CH)

(73) Assignee: HOERBIGER HOLDING AG, Zug (CH)

( * ) Notice: Subject to any disclaimer, the term of this patent is extended or adjusted under 35 U.S.C. 154(b) by 0 days.

(21) Appl. No.: 14/933,564

(22) Filed: Nov. 5, 2015

(65) Prior Publication Data

US 2016/0060084 A1 Mar. 3, 2016

Related U.S. Application Data

(63) Continuation of application No. PCT/EP2014/001242, filed on May 8, 2014.

(30) Foreign Application Priority Data

May 8, 2013 (DE) .................. 10 2013 008 020

(51) Int. Cl.
*B66F 9/065* (2006.01)
*B66F 9/075* (2006.01)
(Continued)

(52) U.S. Cl.
CPC ............ *B66F 9/065* (2013.01); *B62B 5/0003* (2013.01); *B66F 7/065* (2013.01); *B66F 7/0625* (2013.01);
(Continued)

(58) Field of Classification Search
CPC .......... B66F 7/065; B66F 7/08; B66F 7/0625; B66F 9/065; B66F 9/07583; B66F 9/122; B66F 9/24; B66F 17/00; B62B 3/04
See application file for complete search history.

(56) References Cited

U.S. PATENT DOCUMENTS 4,061,237 A * 12/1977 Austin ................ B66F 9/07563
187/231
4,249,749 A * 2/1981 Collier ..................... B62B 1/00
108/145
(Continued)

FOREIGN PATENT DOCUMENTS

CN 201896055 7/2011
DE 2530634 A1 1/1977
(Continued)

OTHER PUBLICATIONS

International Search Report with Written Opinion, dated Jul. 28, 2014, for corresponding international application PCT/EP2014/001242.

*Primary Examiner* — Kaitlin Joerger
(74) *Attorney, Agent, or Firm* — Myers Wolin, LLC

(57) ABSTRACT

A loading apparatus, in particular for conveying freight over a road surface and loading it into a transporting vehicle and unloading it therefrom, comprises a basic structure, a loading structure, with a freight holder, and a double-action lifting device between the basic structure and the loading structure. The loading structure here comprises a lifting frame, on which the lifting device acts, and a freight carrier, which is mounted on the lifting frame, via a pull-out guide with a pull-out direction oriented transversely to the lifting direction, and has the freight holder. An undercarriage serving for advancing the loading apparatus over the road surface is part of the freight carrier.

28 Claims, 6 Drawing Sheets

(51) Int. Cl.
*B66F 7/06* (2006.01)
*B66F 9/12* (2006.01)
*B66F 9/24* (2006.01)
*B66F 17/00* (2006.01)
*B62B 5/00* (2006.01)

(52) U.S. Cl.
CPC .......... *B66F 9/07563* (2013.01); *B66F 9/122* (2013.01); *B66F 9/24* (2013.01); *B66F 17/00* (2013.01); *B62B 2203/10* (2013.01)

(56) References Cited

U.S. PATENT DOCUMENTS

| | | | | |
|---|---|---|---|---|
| 4,288,195 | A * | 9/1981 | Brewer | B62B 3/04 108/143 |
| 4,504,041 | A * | 3/1985 | Raz | B66F 7/0625 254/122 |
| 4,613,272 | A | 9/1986 | vom Braucke et al. | |
| 4,979,592 | A * | 12/1990 | Isogai | B65G 69/24 187/217 |
| 5,018,931 | A * | 5/1991 | Uttley | A61G 7/08 188/5 |
| 6,394,419 | B1 * | 5/2002 | Adams | B66F 7/02 254/9 C |
| 6,431,319 | B1 * | 8/2002 | Myers | B62B 3/02 187/243 |
| 6,679,479 | B1 * | 1/2004 | Watkins | B66F 7/065 254/122 |
| 8,015,638 | B2 * | 9/2011 | Shimada | A47C 19/04 108/145 |
| 8,469,152 | B2 * | 6/2013 | Olsen | B66F 7/065 187/211 |
| 8,888,070 | B2 * | 11/2014 | Olesen | A61G 5/1059 187/211 |
| 9,422,141 | B2 * | 8/2016 | Foley | B66F 7/0625 |
| 9,463,966 | B1 * | 10/2016 | Damabi | B66F 3/22 |
| 9,540,220 | B2 * | 1/2017 | Stewart | B66F 7/0625 |
| 2003/0075657 | A1 * | 4/2003 | Joubert | B66F 7/0608 248/277.1 |
| 2005/0042068 | A1 | 2/2005 | Ehmen | |
| 2011/0262261 | A1 * | 10/2011 | Stewart | B66F 7/0625 414/800 |
| 2014/0014886 | A1 * | 1/2014 | Ruth sen. | B66F 17/00 254/122 |
| 2014/0027693 | A1 * | 1/2014 | Hallman | B66F 5/00 254/8 C |
| 2015/0028787 | A1 * | 1/2015 | Sekine | B66F 9/24 318/494 |
| 2015/0298949 | A1 * | 10/2015 | Mohr | B66F 7/065 254/122 |

FOREIGN PATENT DOCUMENTS

| | | |
|---|---|---|
| EP | 889000 A1 | 1/1999 |
| EP | 1323664 A1 | 7/2003 |
| FR | 1506606 A | 12/1967 |
| FR | 2702751 A1 | 9/1994 |
| WO | 8304226 A1 | 12/1983 |
| WO | 9207746 A1 | 5/1992 |
| WO | 2006006860 A2 | 1/2006 |

* cited by examiner

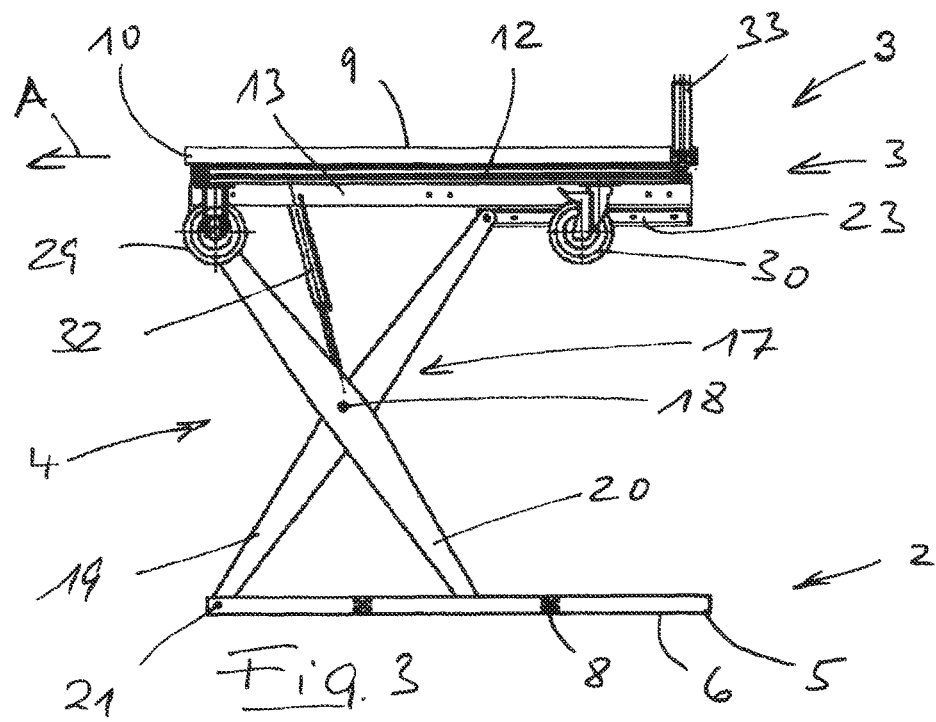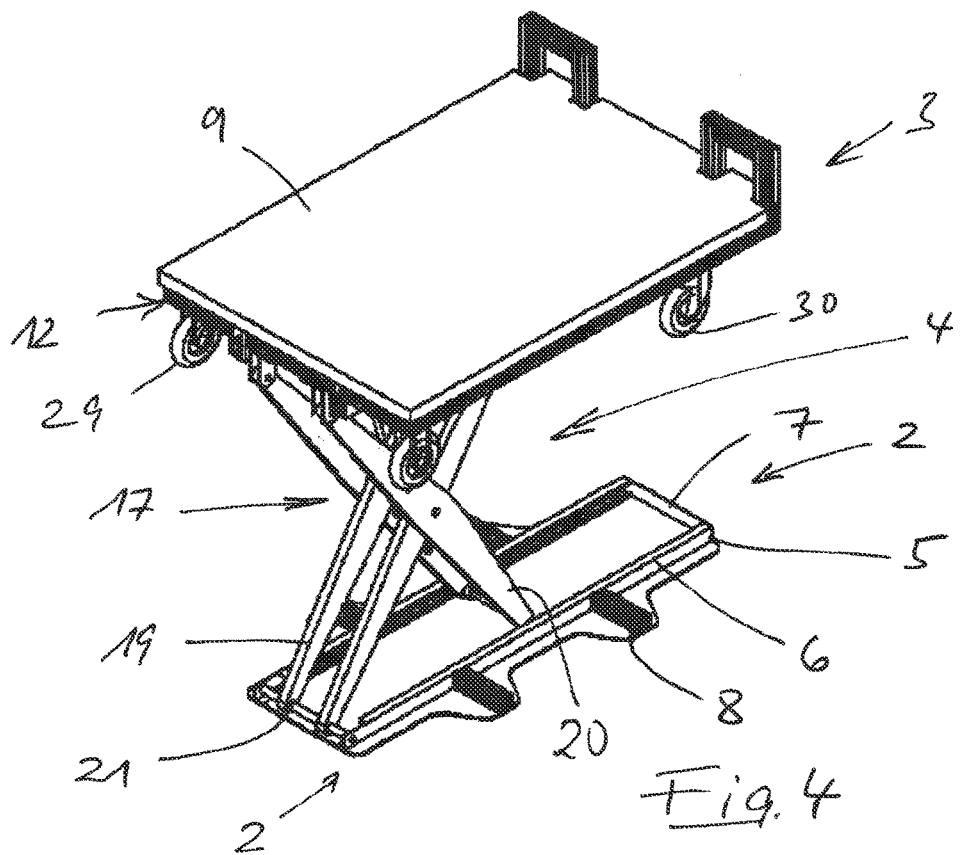

LOADING APPARATUS

CROSS REFERENCE TO RELATED APPLICATIONS

This application is a continuation under 35 U.S.C. §120 of International Application PCT/EP2014/001242, filed May 8, 2014, which claims priority to German Application 10 2013 008 020.7, filed May 8, 2013, the contents of each of which are incorporated by reference herein.

FIELD OF THE INVENTION

The present invention relates to a loading apparatus, suitable in particular for conveying freight over a road surface and loading it into or unloading it from a transport vehicle, comprising a base structure, a loading structure with a freight holder and a double-acting lifting device between the base structure and the loading structure.

BACKGROUND

In the prior art there are numerous proposals for loading apparatuses of the type mentioned in the foregoing, which consistently have the objective of facilitating the loading or unloading of transport vehicles with freight, in order that this—together with the conveying of the freight over a road surface—can be handled if at all possible by a single person. In this way it is intended, for example, that the personnel needed for outgoing delivery of freight can be reduced by eliminating the need for a co-driver, who is active exclusively for a short time during the loading process. Because the lifting device is double-acting by design, it can be used not only for raising or lowering the loading structure (together with the loaded freight) but in the same way—when the loading structure is resting on the loading surface of the transport vehicle—for raising the basic structure, in order that the loading apparatus can be stowed on the loading surface of the transport vehicle.

The pertinent prior art is represented in particular by publications such as FR 1506606, DE 2530634, U.S. Pat. No. 4,061,237, WO 83/04266, U.S. Pat. No. 4,613,272, WO 92/07746, EP 889000, US 2005/0042068 and CN 201896055 U.

Although a need for loading apparatuses of the type mentioned in the introduction obviously exists, it has not been possible—with one exception—to establish the diverse proposals in practice. And even the loading apparatus according to WO 92/07746 or CN 201896055 U—marketed under the trade name "Innolift"—does not meet the expectations placed on it.

SUMMARY

The object of the present invention is to provide a loading apparatus of the type mentioned in the introduction that is characterized by better practicality.

This object is achieved according to the present invention by the fact that, in a loading apparatus of the type mentioned in the introduction, the loading structure comprises a lifting frame, on which the lifting device acts, and a freight carrier, which is mounted on the lifting frame via a pull-out guide with a pull-out direction oriented transversely relative to the lifting direction and is equipped with the freight holder, wherein an undercarriage serving for travel of the loading apparatus over the road surface is part of the freight carrier. In a synergistic functional interaction with one another, the features defining the inventive loading apparatus result in combination with one another in a series of major advantages relevant for practice, which in particular expand the service capabilities of the loading apparatus substantially, facilitate its handling and increase the safety decisively, wherein a loading apparatus exhibiting all of these advantages can be built with relatively simple—and thus reliable—as well as lightweight and compact construction. It is precisely the concern for safety—in cooperation with the other features characteristic for the inventive loading apparatus—that is responsible for the construction of the loading structure in multiple parts, in the sense that the freight holder is disposed on a freight carrier, which is mounted via a pull-out guide on a lifting frame, on which the lifting device—which brings about raising and lowering of the loading structure while the base unit is standing on the road surface—acts in turn, since in this way the freight can be pushed into the loading space or onto the loading surface (final surface) of the transport vehicle without simultaneous movement of the base structure relative to the road surface (starting surface). The loading apparatus, i.e. its base structure, does not have to be maneuvered over the road structure with raised load or raised freight, either during loading of the transport vehicle with the freight or during unloading of the freight from the transport vehicle. This is an invaluable advantage precisely with regard to applications in which a relatively uneven road surface or a relatively uneven other terrain exists (for example during construction-site operation), because such an uneven terrain makes it very difficult to maneuver known loading apparatuses (especially loaded with heavy freight) during their use, and above and beyond this represents a considerable safety risk, especially for maneuvering the loading apparatus with raised load, because of the danger of tilting. In contrast to the situation in that prior art (U.S. Pat. No. 4,613,272, WO 92/07746 and CN 201896055 U), in which part of the base structure is pushed far under the transport vehicle, the inventive loading apparatus can also be used in the situation (which actually often exists) that the transport vehicle is driven up to a curb and, in fact, typically so far that this curb is somewhat underneath the loading edge. Even the sequence of events possible in application of the invention is more homogeneous and marked by fewer interruptions than is the case for the prior art (especially during use of loading apparatuses according to WO 92/07746 and CN 201896055 U), namely especially in view of the fact that the loading apparatus is typically still arranged on the loading surface of the transport vehicle after loading. For this purpose it is necessary, according to the prior art, to transfer the load—by partly raising the loading structure—back onto the base structure equipped with the undercarriage, in contrast to which, in inventive loading apparatuses, the load is directly deposited onto the undercarriage disposed on the freight carrier (especially on wheels, which together with the load-bearing structural zones of the freight carrier are part of the undercarriage serving for travel of the loading apparatus). A series of further advantages will become apparent from the detailed explanation hereinafter of the present invention and specific preferred improvements.

The explanations of the present invention in the foregoing—and also hereinafter—show that the features defining the inventive loading apparatus are to be broadly understood, unless otherwise specified. Thus the base structure may have any desired structural and static geometry by means of which the definitive function, that of bracing the lifting structure on the road surface, can be satisfied. In turn, any device by means of which the loading structure can be raised (and lowered) while the base structure is braced on the road surface and the base structure can be raised (and lowered) while the loading structure is fixed, i.e. braced on the loading surface of a transport vehicle, for example, is suitable as the lifting device. Likewise the phrase "road surface" is to be broadly construed, and it encompasses every load-bearing, i.e. walkable or drivable terrain. Furthermore, "lifting frame" is to be understood as any structure that is suitable for being connected to the lifting device and for directing the forces transmitted from the freight carrier (together with the freight it contains) via the pull-out guide to the lifting frame into the lifting device. Even the "pull-out" guide is not subject to any structural restrictions; to the contrary, such a "pull-out guide" may be realized by any structure of substantially linearly variable length capable of transmitting forces transversely relative to the pull-out direction. Even the statement that the pull-out direction is oriented "transversely" relative to the lifting direction means no more, in the broadest sense, than that the pull-out direction is oriented more or less at right angles to the lifting direction, i.e. in particular is more or less horizontal when the lifting direction is more or less vertical.

Also, and precisely with regard to the "undercarriage", no structural restrictions apply. Whereas for most applications the present invention can be realized advantageously with wheeled vehicles, which preferably have four wheels, this is in no case mandatory. Other suitable undercarriages that can be used advantageously for certain applications are, for example, track-laying undercarriages, skid undercarriages, air-cushion undercarriages, magnetic-levitation undercarriages and the like. The sole deciding factor is that travel over solid terrain such as the road surface and/or the loading surface of a transport vehicle is possible. When the present invention is being explained hereinafter on the basis of an alternative embodiment, in which the undercarriage has the form of a wheeled undercarriage, the sole purpose is to facilitate understanding without being constrained thereby to wheeled vehicles. The demonstrated viewpoints, unless otherwise indicated, are equally valid for other types of undercarriage.

According to a first preferred improvement of the invention, the undercarriage—forming part of the freight holder—comprises (preferably four) wheels, which particularly preferably are disposed on the side edges of the freight carrier and, in fact, ideally are directly under the lateral boundaries of the freight carrier or immediately adjacent to the outside thereof. This permits a large track width of the undercarriage, which represents an important safety-relevant aspect. In addition, wheels with a relatively large diameter can be used in particular in this case, which facilitates manipulation and—again with respect to the use of the loading apparatus on an uneven terrain—is also a safety-relevant aspect. In the interests of good manipulability, preferably at least some of the wheels are steerable, i.e. the wheels in question are designed, for example, as steering rollers (which if necessary can be locked for straight-ahead motion); this facilitates maneuvering of the loading apparatus over the road surface and/or the loading surface of the transport vehicle. In addition, preferably at least some of the wheels are equipped with brakes, which can be applied, for example, during the loading process, when the freight carrier has been deposited on the loading surface of the transport vehicle and—by use of the lifting device—the base structure is to be raised in order to be subsequently pushed under the loading structure once again. (As regards the possibility of storing the lifting device in the flattest possible space-saving form underneath the loading structure, the use of a scissor lift, explained in detail hereinafter, is to be particularly preferred.) For manipulation of the loading apparatus, it is then favorable for the brakes to be remotely operable, for example by a handle mounted at the rear end of the loading apparatus and equipped with appropriate operator controls.

Now that the base structure with raised load does not have to be moved on the terrain, sufficient tilting safety can typically be achieved with a base structure that does not extend laterally beyond the track width of the wheels. This permits a compact construction of the loading apparatus, wherein space for even the complete base structure is even available in general in the intermediate space between the wheels. However, it may also be provided with support feet, on the side set opposite to the pull-out direction, with a span corresponding substantially to the track of the wheels. According to yet another improvement of the invention, also under consideration, the base structure may be equipped with support feet capable of being extended, pulled out and folded out, to increase the stability even more for extreme applications.

Now that the undercarriage suitable for conveying the loading apparatus (together with freight it contains if necessary) over the road surface is part of the freight carrier, no wheels have to be disposed on the base structure. This saves weight, and from static viewpoints is a great advantage. However, the absence of wheels or rollers on the base structure is not an absolute necessity. For example, it is possible to provide (small) rollers, which serve solely for supporting the weight of the base structure while the loading apparatus is being maneuvered over the road surface, so that this does not have to be raised by the lifting device.

According to yet another preferred improvement of the present invention, the lifting device comprises a scissor lift. This is favorable with regard to the kinematics and also with regard to the statics as well as the possibility of making the inventive loading apparatus extremely compact and lightweight. In particular, in the case of use of a scissor lift as part of the lifting device, the latter can be collapsed to particularly flat and space-saving shape, so that in this configuration it can be stored underneath the loading structure. Particularly advantageously, at least one of the arms of this scissor lift is cranked and/or a drive element engages with one of the arms at a position offset from the pivot point of the scissor lift, thus permitting the provision of adequately large lifting forces with—when the loading structure is lowered—particularly flat scissor lifts. In the sense of favorable kinematic conditions, the bearing of the scissor lift located in pull-out direction (of the freight holder) on the base structure is designed particularly preferably as a fixed bearing; this means that the bearing of the scissor lift located opposite the pull-out direction on the base structure is constructed as a floating bearing (with support element guided in at least one linear guide).

Another preferred improvement of the present invention is characterized in that the lifting device comprises an electrical or an electrohydraulic drive unit. This permits compact and nevertheless very powerful loading apparatuses, wherein, especially for larger loading apparatuses intended for lifting particularly heavy freights the use of electrohydraulic drive units for the lifting devices is particularly advantageous. An electrical storage unit of the drive unit provided in this respect is disposed particularly preferably on the loading structure, and, in fact, particularly preferably on the lifting frame on its front side located at the front in pull-out direction. This contributes to a relatively favorable weight distribution, especially with regard to the phase of raising or lowering of the base structure for freights resting on the loading surface of the transport vehicle, without the need (which would be necessary if the storage unit were disposed on the freight carrier) for complex laying of electrical conductors. When this electrical storage unit is provided with a charging terminal, which can be connected to the electrical system of a transport vehicle (designed as a motor vehicle), a relatively small electrical storage unit is sufficient for typical applications. This is advantageous with regard to costs, weight and overall size of the loading apparatus. It is also favorable to construct the electrical storage unit of the drive unit as an interchangeable battery. This permits a very small size of the storage unit, so that it fits in a relatively compact loading apparatus without hereby restricting the use capabilities of the loading apparatus. An interchangeable battery removed from the loading apparatus may be recharged on the electrical system of a transport vehicle.

In yet another preferred improvement of the present invention, a further drive unit brings about extension and retraction of the freight carrier relative to the lifting frame. Such an extending drive may be of electrical type, for example. Likewise, such an extending drive could comprise, for example, a hydraulic cylinder, which is supplied by the hydraulic assembly of the electrohydraulic drive unit of the lifting device. From viewpoints of operating safety, it is advantageous if a controller, which controls the extension movement with due consideration of safety-relevant parameters, acts on the extending drive. In this way, for example, the signal of at least one sensor disposed on the freight carrier, preferably in the region of the front wheels, and serving to detect the position of the freight carrier relative to a loading surface, can be processed in the controller in such a way that the extension of the freight carrier (which takes place over a set extension distance of, for example, 400 mm) is suppressed if the undercarriage is not located at least partly over a loading surface. The height of the undercarriage of the freight carrier above the loading surface can also be taken into consideration in the controller in such a way that (further) extension of the freight carrier is suppressed when the undercarriage is located at a height above a loading surface that exceeds a permissible value. Furthermore, signals of load sensors, which are assigned to support feet of the base structure and/or to wheels of the undercarriage, can be evaluated in the controller of the extending drive for the purpose of suppressing (further) extension of the freight carrier when a load situation suggestive of an increasing tilting danger is determined. The said safety-relevant parameters may also be used additionally (or alternatively) for generation of a notification or warning.

Under static viewpoints, it may be favorable for the base structure to have a relatively large, continuous bearing surface bracing it on the road surface. Conversely, however, it may also be advantageous for certain applications to dispose distinct support feet on the base structure. This is applicable in particular when a load sensor (see above) is assigned to at least one support foot, to monitor the load situation and, for example, to emit a signal when the load distribution approaches a critical point with regard to stability. Such load sensors may also be assigned with the same advantage to at least one of the wheels disposed on the freight carrier.

Particularly preferably, the freight carrier and the lifting frame can be interlocked relative to one another. And preferably the lifting device can be locked in a partly raised position of the loading structure. This makes it possible, when the transport vehicle is en route, to secure the loading apparatus on the loading surface in such a way that the loading structure is raised so far by means of the lifting device that the wheels disposed on the freight carrier are raised from the loading surface, wherein the location of the freight carrier and thus of the freight relative to the base structure is additionally secured via the interlocking of the freight carrier relative to the lifting frame. In this case it is advantageous, for example by means of an appropriate setting in a controller of the loading apparatus, to preset such a (partly raised) position of the lifting device, in which the undercarriage of the freight carrier is positioned just out of contact with the terrain, so that the entire weight of the loading apparatus and load—while keeping the center of gravity as low as possible—is braced exclusively via the base structure on the terrain. To secure the freight against or on the freight carrier, the latter is preferably provided with retainers suitable for attaching fastening and/or securing means for the freight, for example, eyes, boreholes, openings or hooks.

For operator control of the loading apparatus as well as arranging and maneuvering as well as actuation of scheduled drives, the loading apparatus is preferably provided on its rear end opposite the pull-out direction with a handle, which is equipped with corresponding operator controls for actuating the drives. Preferably such a handle is disposed on the base structure or the lifting frame. The arrangement and configuration of the handle are then preferably chosen such that it neither hinders the base structure from being pushed (preferably completely) underneath the loading structure, nor constantly projects perceptibly beyond the minimum contour of the main components of the loading mechanism (while the loading structure is lowered and the freight carrier retracted). In this sense the handle can be attached to the base structure or lifting frame by pivoting or hinged means, for example, and/or by retracting means. The handle and/or its attachment to the base structure or to the lifting frame is then advantageously designed such that grips disposed on it experience only slight or no change of their own height even when the height of the base structure or lifting frame above the terrain is changed in the intended manner during operation of the loading apparatus. Against the same background, it is particularly advantageous, according to another preferred improvement, when the handle is equipped with an extensible drawbar, which can be lengthened or shortened telescopically, for example, since this facilitates operator control of the loading device during its use as intended, during which the height of the lifting frame and of the base structure above the road surface is being changed. It is particularly convenient when the length of the drawbar can be varied by a length-adjusting drive. This can, in the interests of further increase in ease of operator control, be coupled phase-wise with the lifting drive, in the sense that the length of the drawbar shortens automatically when the component (base structure or lifting frame) to which it is attached is raised by means of the lifting device. In the case of attachment of the drawbar to the lifting frame, inverse (phase-wise) coupling of the length-adjusting drive of the drawbar with the drive of the lifting device must be provided for the purpose. Incidentally, it is advantageous from ergonomic viewpoints when the extension direction of the drawbar is oriented obliquely relative to the lifting direction, i.e. in particular is inclined slightly toward the rear.

For the most diverse usability possible of the inventive loading apparatus, the freight carrier therein is provided, according to yet another preferred improvement, with an exchangeable attachment having a specific function or application. Such an attachment may be, for example, a (level) loading platform, a bulk goods holder or a special retainer (e.g. for a cable drum).

This means that particularly large loading apparatuses may be equipped with an additional propulsion drive, which acts on at least one of the wheels and which can be used to assist the operating person during movement of the loading apparatuses over the road surface (which may be uneven) or the loading surface of the transport vehicle (including arranging it).

Within the meaning of the foregoing explanations of the invention, the sequence of events during use thereof is as follows: the freight or load, seated on a starting surface, is conveyed on a freight carrier, which is part of a raisable loading structure and has an undercarriage serving travel. A base structure is deposited on the starting surface, and the loading structure—braced on the base structure—is raised so far that the undercarriage of the freight carrier is positioned above the level of a final surface higher than the starting surface. The freight carrier is extended transversely relative to the lifting direction and in the process is maneuvered over the final surface and, in fact, without simultaneous movement of the base structure, wherein the freight carrier is braced during each maneuver (after lowering as the case may be) with its undercarriage on the final surface. Once the freight carrier is resting completely on the final surface, the base structure is raised completely, retracted in the direction of the freight holder and maneuvered over the final surface. Travel of the freight or load over the final surface by means of the undercarriage of the freight carrier can then take place, and the position can also be secured by raising the undercarriage of the freight carrier from the final surface while placing the base structure on the final surface.

The inventive loading apparatus may be provided with at least one auxiliary roller, which can be disposed at variable positions on the front side of the freight carrier, although this is not necessary for typical applications. This may be used if necessary in connection with translational movement of the freight carrier over the loading surface of the transport vehicle, for example if the base structure is in unstable condition because the terrain is not load-bearing or else it has not been possible for some other reason to bring the loading apparatus directly up to the transport vehicle.

From the foregoing explanations it is apparent that the loading and unloading of transport vehicles by means of the inventive loading apparatus represents merely one example of many conceivable applications. The inventive loading apparatus, which in this context could also be described as a combined conveying and lifting device, can also be used in diverse other application environments, for example in picking and warehousing systems.

BRIEF DESCRIPTION OF THE DRAWINGS

The present invention will be explained in more detail hereinafter on the basis of two exemplary embodiments illustrated in the drawing, wherein FIG. 3 shows, in side view, the embodiment according to FIGS. 1 and 2 in a second configuration, FIG. 4 shows, in perspective view, the embodiment according to FIGS. 1 to 3 in its second configuration.

DETAILED DESCRIPTION OF THE PREFERRED EMBODIMENTS

Figure 1:
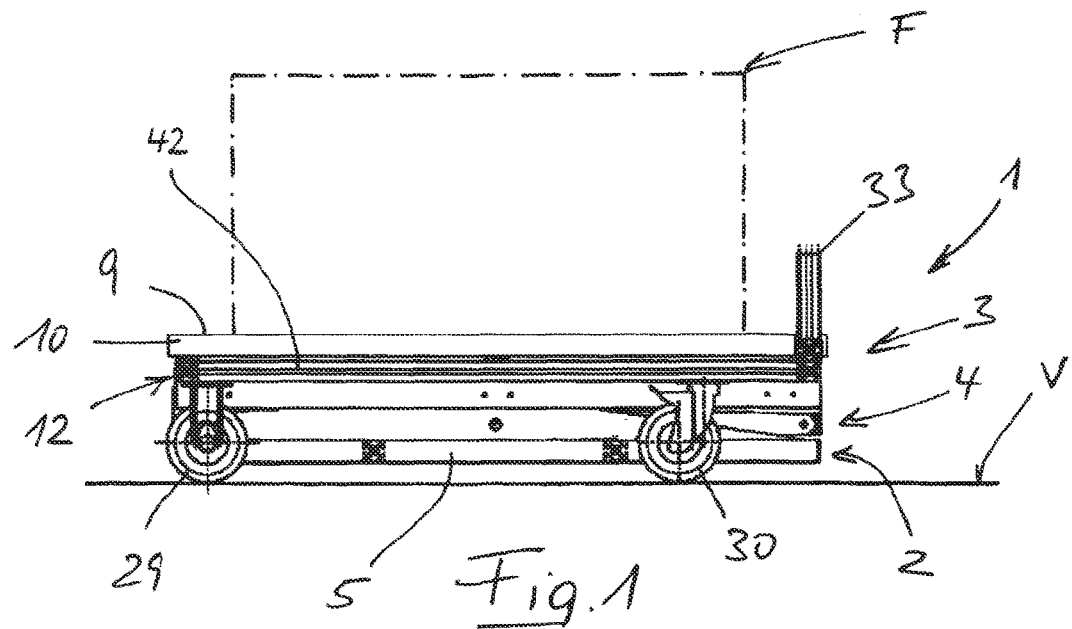
FIG. 1 shows, in side view, a first embodiment of an inventive loading apparatus in a first configuration.
Figure 2:
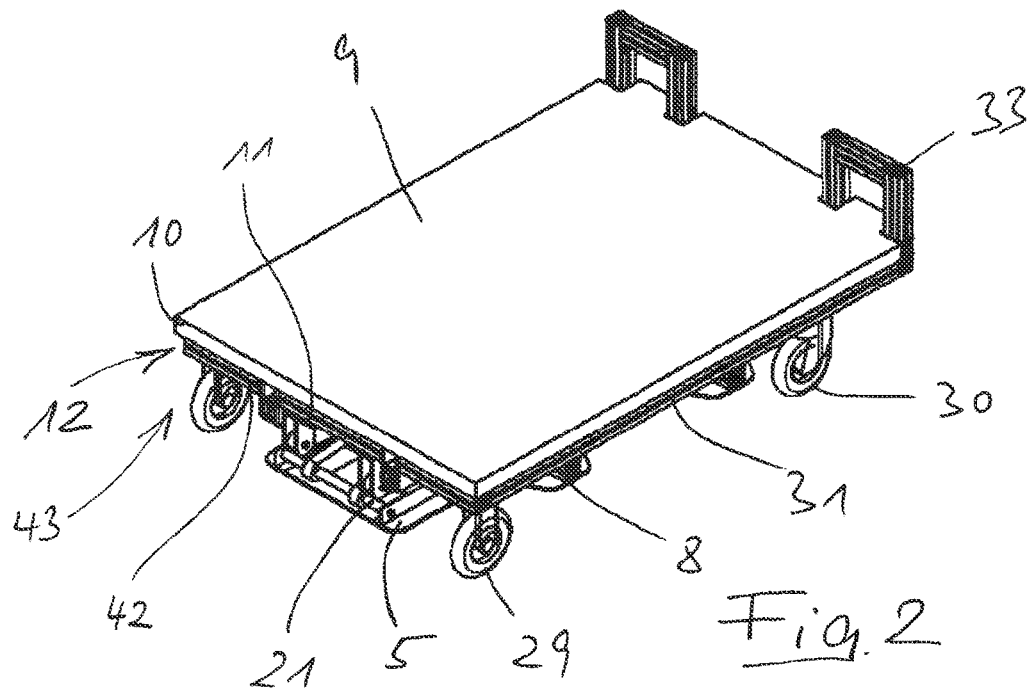
FIG. 2 shows, in perspective view, the embodiment according to FIG. 1 in its first configuration.
Figure 5:
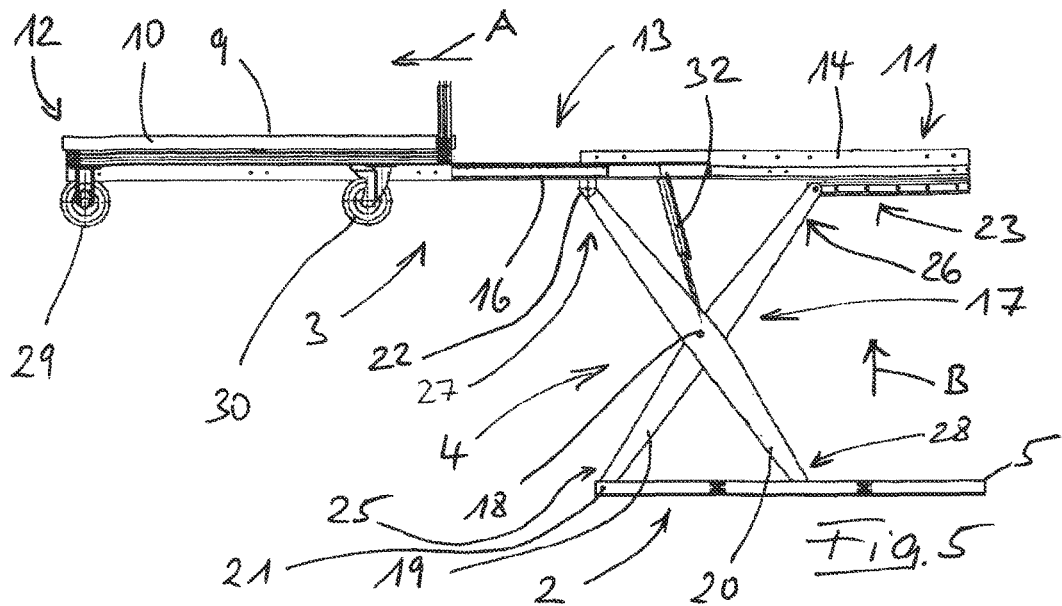
FIG. 5 shows, in side view, the embodiment according to FIGS. 1 to 4 in a third configuration.
Figure 6:
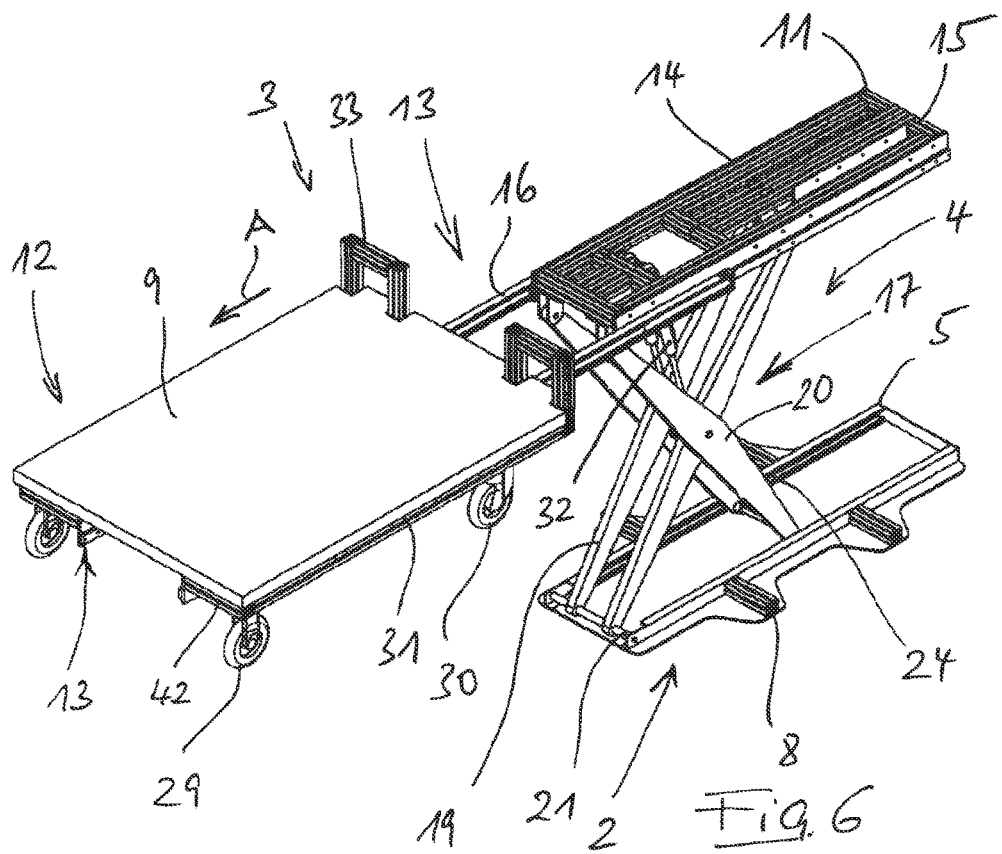
FIG. 6 shows, in perspective view, the embodiment according to FIGS. 1 to 5 in its third configuration.
Figure 7:
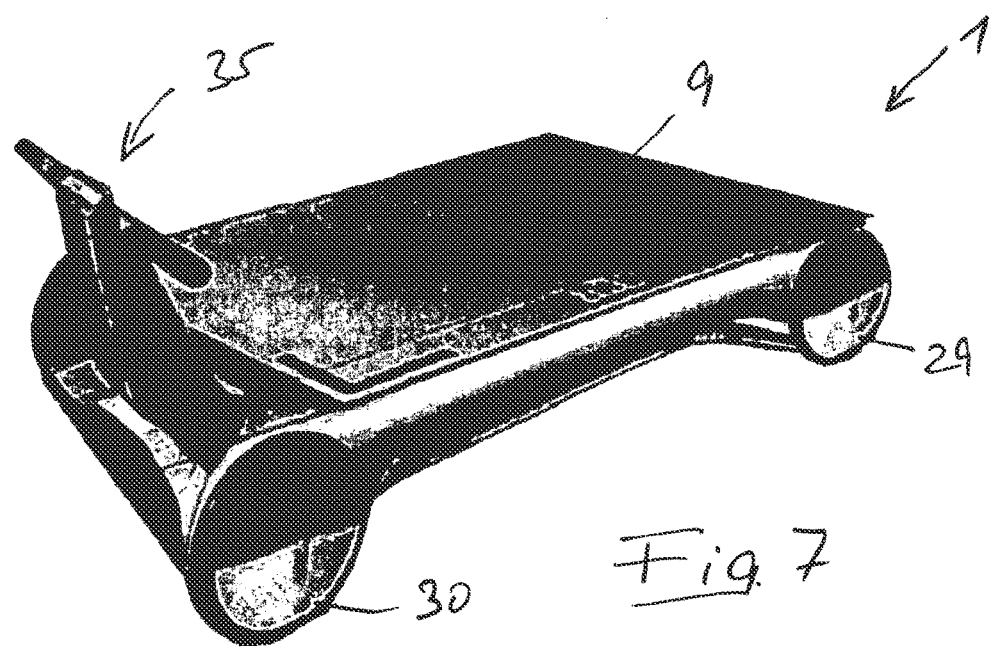
FIG. 7 shows, in perspective view, a second embodiment of an inventive loading apparatus in a second configuration.

Loading apparatus 1 shown in various configurations (i.e. operating situations) and views in FIGS. 1 to 6 is used for conveying freight F over a road surface V as well as for loading the freight into or unloading it from a transport vehicle.

The loading apparatus comprises three main components, namely a base structure 2, a loading structure 3 and a lifting device 4, acting between base structure 2 and loading structure 3 and serving to raise and lower loading structure 3. Thus lifting device 4 is double-acting in the sense that it is also suitable for raising base structure 2 when loading structure 3 is fixed in position.

Base structure 2 is constructed as a base frame 5 with two longitudinal beams 6 and two crossbeams 7 extending between them and transversely relative to them. On both sides two reinforced support feet 8 protrude sideways from longitudinal beams 6. In the sense of a modification—which if necessary is expedient for reasons of stability—of base structure 2, support feet capable of being extended, pulled out or folded out and having a broader span when deployed may also be used.

Loading structure 3, which is provided with a freight holder 10—constructed as a loading platform 9 in the present case—comprises a lifting frame 11, a freight carrier 12 with loading platform 9 and a pull-out guide 13, by means of which freight carrier 12 is mounted in pull-out relationship (arrow A) on lifting frame 11. Lifting frame 11 comprises longitudinal beams 14 and crossbeams 15 extending between them and transversely relative to them. Lifting device 4 acts thereon. Pull-out direction A, in which freight carrier 12 can be extended from its position substantially flush with lifting frame 11 to a position offset relative to lifting frame 11, is then oriented transversely relative to the lifting direction (arrow B), which is defined by the lifting and lowering movement of loading structure 3 relative to base structure 2. By use of an intermediate rail 16, pull-out guide 13 is constructed as a fully extensible means, so that freight carrier 12 in its extended position is offset completely relative to lifting frame 11. Freight carrier 12 is provided with retainers (not illustrated in more detail), which are suitable for attachment of fastening and/or securing means for freight F. In the sense of a modification—which is related to the application—freight carrier 12 could be adapted to the respective specific use, by being otherwise provided with, for example, a bulk-goods holder (such as a trough or the like) or a special retainer (such as a cable drum retainer or the like) instead of a loading platform 9.

Lifting device 4 comprises a scissor lift 17 with two crossed arm pairs 19, 20 joined pivotally to one another at crossing point 18. Each arm pair 19, 20 is pivotally joined at its one end with the component in question via a fixed bearing 21, 22 and at its other end is guided displaceably on the other component along a linear guide 23, 24. Thus first arm pair 19 is pivotally joined at its lower end 25—at the front in pull-out direction A—with base frame 5 via fixed bearing 21 and at its upper end 26 is guided displaceably on lifting frame 11 along a linear guide 23; and second arm pair 20 is pivotally joined at its upper end 27 with lifting frame 11 via fixed bearing 22 and at its lower end 28 is guided displaceably on base frame 5 along a linear guide 24. Accordingly, while loading structure 3 is being raised, crossing point 18 of the two arm pairs 19, 20 follows a circular path around fixed bearing 21 of first arm pair 19 and in doing so (also) moves with a movement component in pull-out direction A. In the sense of a modification—which may be expedient for kinematic reasons—of scissor lift 17, cranked arms (known as such) may also be used.

Four of the wheels 29, 30 serving for travel of loading apparatus 1 over road surface V—in order to convey freight F over them—are disposed on freight carrier 12, and, in fact on the side edges thereof directly underneath lateral rims 31. Together with frame parts 42 of freight carrier 12 they form an undercarriage 43. In the present case, front wheels 29—in pull-out direction A—are constructed as fixed rollers, whereas rear wheels 30 are constructed as steering rollers, although obviously other embodiments of the wheels (e.g. four steering rollers) are also possible. Wheels 29, 30 are equipped with (lockable) brakes, by means of which freight carrier 12 or loading apparatus 1 can be prevented from inadvertently rolling away. In contrast, no wheels are disposed on base structure 2 in the present case. Support feet 8 of base structure 2 are dimensioned such that they pass between rear wheels 30 of freight carrier 12. In the sense of a modification, however, rear support feet 8 could also be offset to the rear behind rear wheels 30 and in this case dimensioned such that their span corresponds substantially to the track of wheels 29, 30. However, base structure 2—in the interests of ease of manipulation of loading apparatus 1—should not extend sideways beyond the track width of wheels 29, 30.

Loading apparatus 1 has several drives. In particular, lifting device 4 is equipped with a drive unit. This comprises two hydraulic cylinders 32, which are disposed parallel to one another and which, linked pivotally on one of crossbeams 15 of lifting frame 11, extend between lifting frame 11 and pivot pins disposed at crossing point 18 of arm pairs 19, 20 of scissor lift 17. Hydraulic cylinders 32 are pressurized by a hydraulic assembly—not illustrated—the pump of which is electrically powered. The electrical storage unit of the drive unit is disposed on freight carrier 12. It has a charging terminal that can be connected to the electrical system of a transport vehicle designed as a motor vehicle. Alternatively, a purely electrical design of the drive unit of lifting device 4 would be possible, for example, especially for loading apparatuses with reduced power.

By means of a further drive, namely an electrical extending drive acting between lifting frame 11 and freight carrier 12, freight carrier 12 can be extended into its extended position and refracted to its position flush with lifting frame 11. Furthermore, freight carrier 12 can be interlocked relative to lifting frame 11—for example by immobilizing pull-out guide 13 or blocking the extending drive—and lifting device 4 can be locked in a partly raised position of loading structure 3. In this way loading apparatus 1 (and freight F that it contains) is secured on the loading surface of the transport vehicle during transport, specifically because freight carrier 12 is locked relative to lifting frame 11 and loading structure 3 is raised so far as a whole that wheels 29, 30 no longer rest on the loading surface, and so the entire weight of freight F and loading apparatus 1 is braced via its base frame 5 on the loading surface.

In the embodiment according to FIGS. 1 to 6, the operator control or actuation of the various drives by an operator-control person takes place by operator controls, which are integrated in handles 33 mounted on freight carrier 12. In this respect in particular, the second embodiment illustrated in FIGS. 7 to 10 is based on a different principle. Therein a handle 35, which has operator controls 36 for actuation of the various drives and which further serves to direct or maneuver loading apparatus 1 during its travel over the road surface or to do likewise for the loading surface of the transport vehicle, is disposed on lifting frame 11 at its end opposite pull-out direction A.

Figure 8:
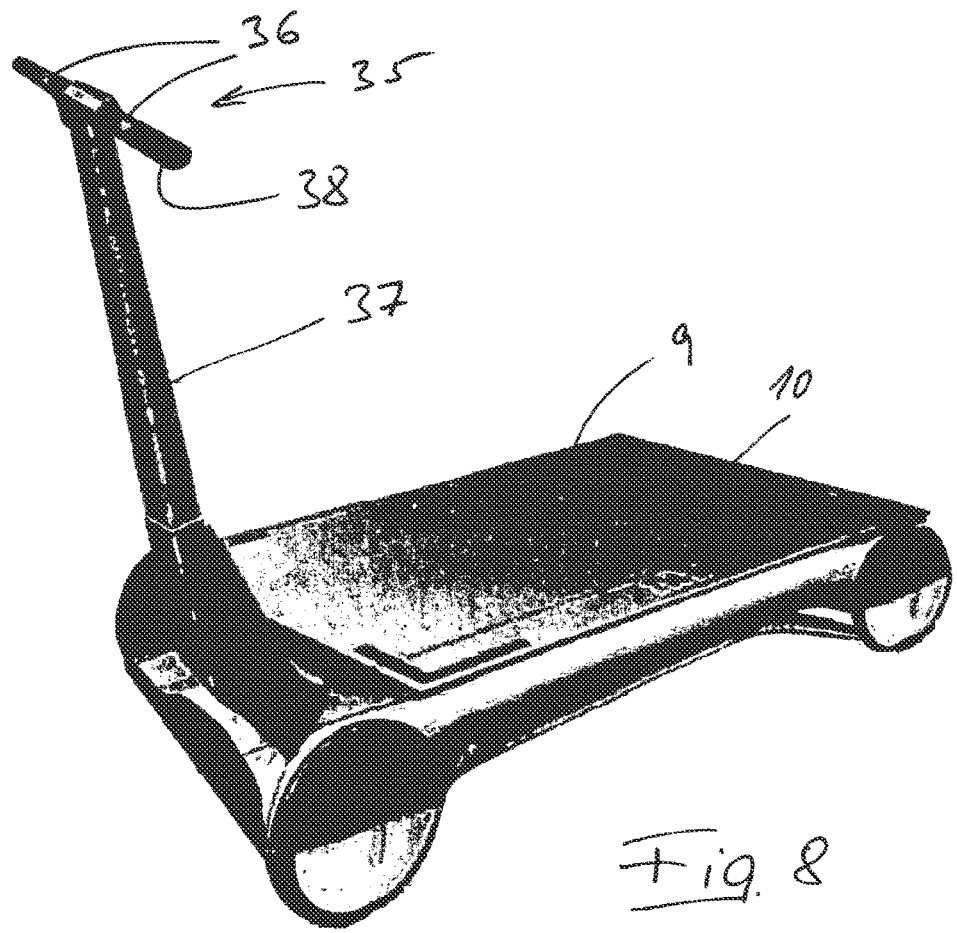
FIG. 8 shows the embodiment according to FIG. 7 in a second configuration.
Figure 9:
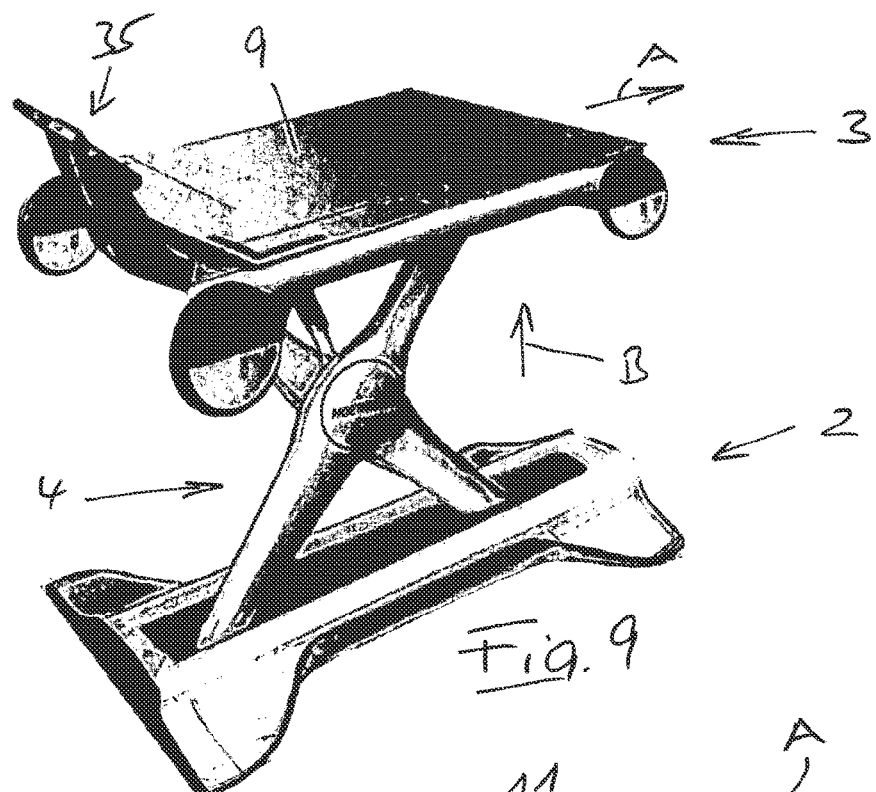
FIG. 9 shows the embodiment according to FIGS. 7 and 8 in a third configuration.
Figure 10:
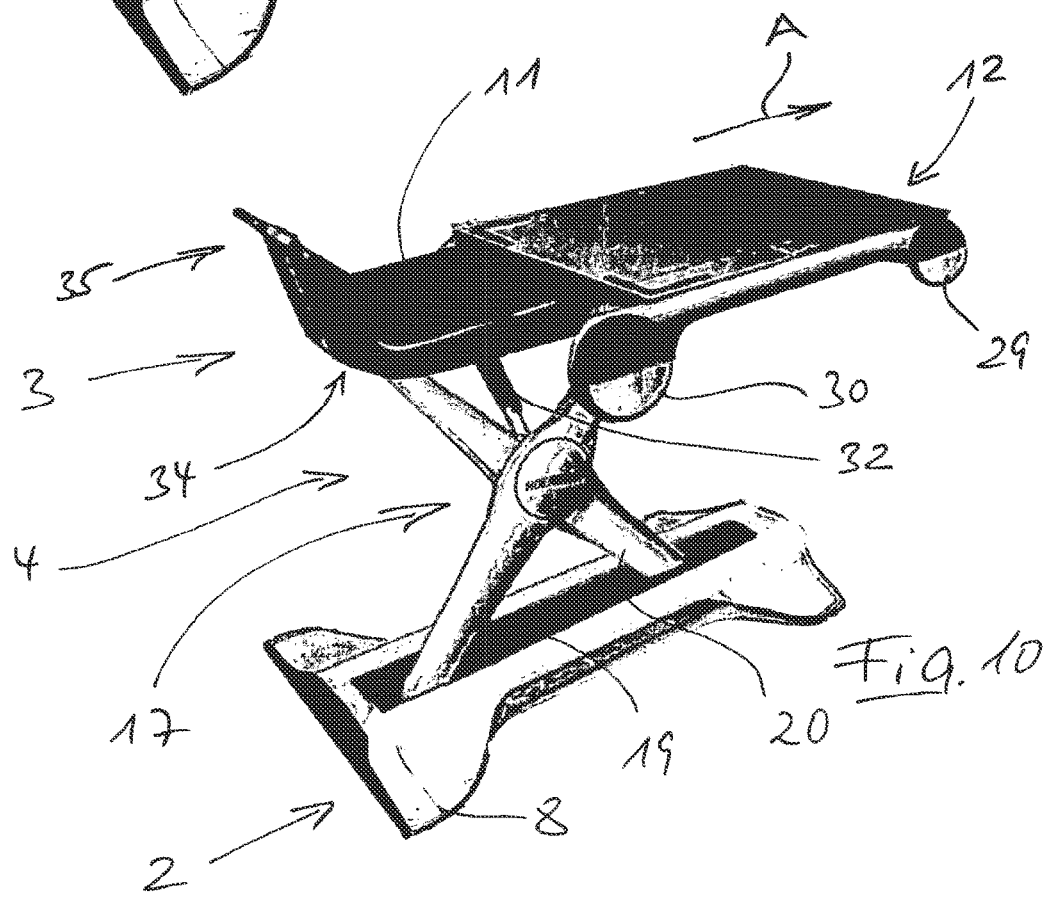
FIG. 10 shows the embodiment according to FIGS. 7 to 9 in a fourth configuration.

Handle 35 has a drawbar 37, which is inclined slightly rearward from its stowed position (FIG. 7) and can be extended telescopically into an operating position (FIG. 8). The length-adjusting drive bringing about the adjustment of the length of drawbar 37 is then inversely coupled—via the controller of loading apparatus 1—with the drive unit of lifting device 4 in such a way that, when loading structure 3 is raised, the length of drawbar 37 becomes substantially shorter by the proportion by which loading structure 3 is raised, with the result that grips 38 of handle 35 remain at least substantially at constant height while loading structure is being raised. The situation is analogous while loading structure 3 is being lowered. Incidentally, in this embodiment, the brakes assigned to wheels 29, 30 can also be operated via operator controls 36 disposed on handle 35.

Other striking deviations of the embodiment according to FIGS. 7 to 10 from that according to FIGS. 1 to 6 consist in structural details of scissor lift 17 as well as pull-out guide 13 for freight carrier 12, although the deviations have no effect on the basic function, and so the foregoing explanations about the first embodiment are essentially valid for the second as well. Incidentally, wheels 29, 30 are also configured differently in the second embodiment compared with the first. They are disposed laterally on freight carrier 12, and so—in the interests of increased fitness for use on uneven road surfaces—they may have a relatively large diameter.

Incidentally, especially load sensors, which are assigned to wheels 29, 30 and/or to support feet 8 of base structure 2, may be connected to the controller of the loading apparatus. By monitoring the load situation at support feet 8 and/or wheels 29, 30, load conditions that could be critical for the stability of loading apparatus 1 are detected early, and a warning (e.g. acoustic) can be tripped and/or one or more drives can be automatically locked.

Figure 11:
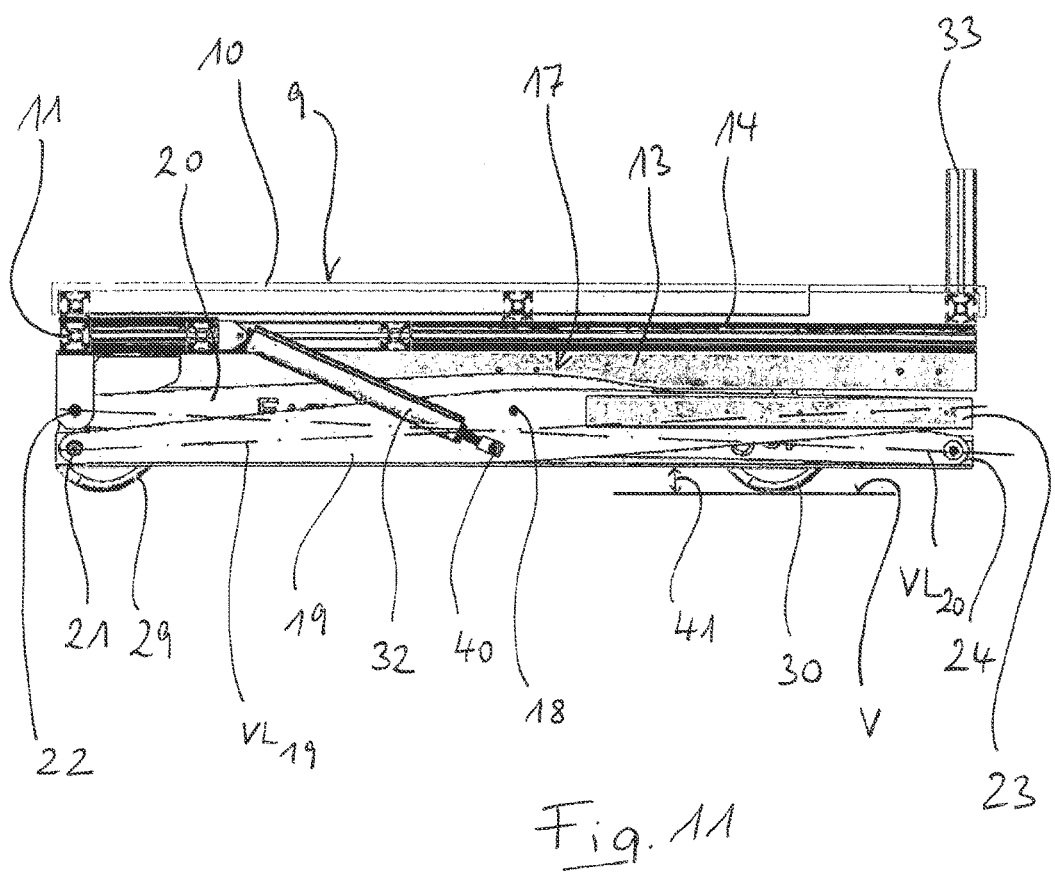
FIG. 11 shows, in enlarged representation in a vertical section, a loading apparatus with a lifting device equipped with a preferred scissor lift.

Concerning the embodiment illustrated in FIG. 11, this is explained directly from the foregoing explanations for FIGS. 1 to 10. What must be pointed out, however, is the readily apparent slightly cranked shape of arms 19 and 20 of scissor lift 17, to the effect that the pivot provided at crossing point 18 does not lie exactly on connecting lines VL19 and VL20 of the two bearings disposed respectively at the ends of arms 19, 20, but instead are offset slightly upward relative to these connecting lines. Conversely, relative to connecting line VL19, link point 40 of hydraulic cylinders 32 on arms 19 is offset slightly downward from the bearing at its end. This feature yields a scissor lift 17 that is so flat in its (shown) completely retracted configuration that not only does it have space (projecting slightly upward between pull-out guides 13) underneath loading structure 3 but also a sufficient bottom clearance 41 still remains, and does so even if arms 19, 20 are dimensioned with sufficient thickness to lift heavy loads and the kinematics of the drive are appropriate for lifting heavy loads. It is also evident in FIG. 11 that lifting frame 11 and the two frame parts 42 of freight carrier 12 joined thereto via pull-out guides 13, as already illustrated in FIGS. 1 to 6, lie substantially in the same plane, in which case lifting frame 11 finds space between frame parts 42 of the freight carrier 11 when freight carrier is in the retracted position.

In both embodiments, the sequence during loading of a transport vehicle with freight F (including conveying of the freight to the transport vehicle) typically takes place as follows:

Loading apparatus 1 is moved together with lowered loading structure 3 and freight F contained on its retracted freight carrier 12—on wheels 29, 30 disposed on freight carrier 12—over road surface V to the transport vehicle, while the pull-out guide is interlocked and base structure 2 is completely raised by means of lifting device 4.

Loading apparatus 1 is positioned adjacent to the transport vehicle, close to the access opening to its loading surface, and, in fact, with pull-out direction A pointing toward the transport vehicle.

Depending on the conditions of the ground surface, wheels 29, 30 may or should be braked in this situation.

To deposit base structure 2 on the road surface and then raise loading structure 3, lifting device 4 is actuated and, in fact, long enough until wheels 29, 30 of freight carrier 12 are positioned slightly above the level of the loading surface of the transport vehicle. If it has been necessary to apply the brakes of wheels 29, 30, they may be released again.

After pull-out guide 13 has been unlocked, freight carrier 12 is maneuvered in pull-out direction A using pull-out guide 13 (and the extending drive if present), whereupon it advances increasingly over the loading surface of the transport vehicle.

As soon as front wheels 29 of freight carrier 12 are positioned over the loading surface of the transport vehicle, loading structure 3 is lowered by means of lifting device 4 so far that front wheels 29 of freight carrier 12 rest on the loading surface of the transport vehicle.

Freight carrier 12 is maneuvered—by continued use of pull-out guide 13 (and of the extending drive if necessary)—further in pull-out direction A, whereupon rear wheels 30 of freight carrier 12 also rest on the loading surface of the transport vehicle.

The brakes of wheels 29, 30 are applied.

Lifting device 4 is actuated in the sense that base structure 2 is raised.

When base structure 2 is completely raised, it is retracted, i.e. pushed underneath loading structure 3, using pull-out guide 13 (and the extending drive if necessary). Then pull-out guide 13 is interlocked.

The brakes are released, allowing loading apparatus 1 to be arranged in its final position on the loading surface of the transport vehicle.

Depending on the standing conditions of the transport vehicle, wheels 29, 30 may or should be braked upon reaching the final position.

By means of lifting device 4, loading structure 3 is raised slightly, namely so far until wheels 29, 30 of the loading surface of the transport vehicle are lifted. Lifting device 4 is locked in this position.

If necessary, freight F—remaining on loading apparatus 1—may be secured directly on the transport vehicle using separate securing means, to prevent slipping, etc.

Freight is unloaded from the transport vehicle by proceeding in the inverse sequence.

What is claimed is:

1. A loading apparatus (1), especially for conveying freight (F) over a road surface (V) and loading it into or unloading it from a transport vehicle, comprising:
   a base structure (2),
   a loading structure (3) with a freight holder (10) and
   a double-acting lifting device (4) between the base structure (2) and the loading structure (3),
   wherein the loading structure (3) comprises a lifting frame (11), on which the lifting device (4) acts, and a freight carrier (12), which is mounted on the lifting frame (11) via a pull-out guide (13) with a pull-out direction (A) oriented transversely relative to the lifting direction (B) and is equipped with the freight holder (10),
   wherein the lifting device comprises a scissor lift, and
   wherein the bearing of the scissor lift located in the pull-out direction on the base structure is a fixed bearing and the bearing of the scissor lift located opposite the pull-out direction is a floating bearing such that a crossing point of arms of the scissor lift move towards the pull-out direction when the loading structure is lifted by the scissor lift, and
   wherein an undercarriage (43) serving for travel of the loading apparatus (1) over the road surface (V) is part of the freight carrier (12).

2. The loading apparatus of claim 1, wherein the undercarriage (43) comprises wheels (29, 30), preferably four wheels (29, 30), which particularly preferably are disposed on the side edges of the freight carrier (12).

3. The loading apparatus of claim 2, wherein that at least some of the wheels (29, 30) are steerable.

4. The loading apparatus of claim 2, wherein at least some of the wheels (29, 30) are equipped with brakes, which preferably can be remotely actuated.

5. The loading apparatus of claim 1, wherein the base structure (2) does not extend laterally beyond the width of the undercarriage (43), especially the track width of the wheels (29, 30).

6. The loading apparatus of claim 5, wherein the width of the base structure (2) on its side opposite the pull-out direction (A) corresponds substantially to the width of the undercarriage (43), especially the track width of the wheels (30).

7. The loading apparatus of claim 1, wherein support feet (8) are disposed on the base structure (2).

8. The loading apparatus of claim 7, wherein a load sensor is assigned to at least one of the support feet (8).

9. The loading apparatus of claim 7, wherein at least one of the support feet (8) can be laterally extended, pulled out or folded out.

10. The loading apparatus of claim 1, wherein no wheels are disposed on the base structure (2).

11. The loading apparatus of claim 1, wherein an extending drive acting between the lifting frame (11) and the freight carrier (12) is provided.

12. The loading apparatus of claim 11, wherein a controller, which controls the extension movement with due consideration of safety-relevant parameters, acts on the extending drive.

13. The loading apparatus of claim 1, wherein at least one sensor for detection of the position of the freight carrier (12) relative to a loading surface is disposed on the freight carrier (12), preferably in the region of the front wheels (29).

14. The loading apparatus of claim 1, wherein at least one of the arms (19, 20) of the scissor lift is cranked and/or a drive element (32) acts on one of the arms (19) at a position offset from the pivot point (18).

15. The loading apparatus of claim 1, wherein the lifting device (4) comprises an electrical or an electrohydraulic drive unit.

16. The loading apparatus of claim 15, wherein an electrical storage unit of the drive unit is disposed on the lifting frame (11), preferably on its front side pointing in pull-out direction (A).

17. The loading apparatus of claim 15, wherein an electrical storage unit of the drive unit is designed as an interchangeable battery.

18. The loading apparatus of claim 15, wherein an electrical storage unit of the drive unit is provided with a charging terminal, which can be connected to the electrical system of a transport vehicle designed as a motor vehicle.

19. The loading apparatus of claim 1, wherein at least one auxiliary roller is disposed at variable positions on the front side of the freight carrier (12).

20. The loading apparatus of claim 1, wherein the freight carrier (12) can be interlocked relative to the lifting frame (11).

21. The loading apparatus of claim 1, wherein the lifting device (4) can be locked in a partly raised position of the loading structure (3).

22. The loading apparatus of claim 1, wherein a handle (35), which is equipped with operator controls, is disposed on the lifting frame (11) at its end opposite the pull-out direction (A).

23. The loading apparatus of claim 22, wherein the handle (35) is attached to the lifting frame (11) or to the base structure (2) by pivoting or retracting means.

24. The loading apparatus of claim 22, wherein the handle (35) is equipped with an extensible drawbar (37), wherein the extension direction of the drawbar (37) is oriented obliquely relative to the lifting direction (B), preferably by being inclined slightly in rearward direction.

25. The loading apparatus of claim 24, wherein the length of the drawbar (37) can be varied by a length-adjusting drive, wherein the length-adjusting drive preferably can be inversely coupled phase-wise with the lifting drive.

26. The loading apparatus of claim 1, wherein the freight carrier (12) is provided with a loading platform (9), at least one bulk-goods holder or a special retainer, especially as part of an exchangeable attachment.

27. The loading apparatus of claim 1, wherein the freight carrier (12) is provided with suitable retainers for attachment of fastening and/or securing means for the freight.

28. The loading apparatus of claim 1, wherein the pull-out guide comprises three slidable members including an intermediate rail.

* * * * *